United States Patent

[11] 3,611,158

[72] Inventor Lyle R. Strathman
Cedar Rapids, Iowa
[21] Appl. No. 875,609
[22] Filed Nov. 12, 1969
[45] Patented Oct. 5, 1971
[73] Assignee Collins Radio Company
Cedar Rapids, Iowa

[54] SIGNAL PULSE TRIGGER-GATING EDGE JITTER REJECTION CIRCUIT
8 Claims, 4 Drawing Figs.

[52] U.S. Cl. .......... 328/119,
307/221, 307/234, 328/37, 328/162, 340/167 B
[51] Int. Cl. .......... H03k 13/00
[50] Field of Search .......... 307/234,
221; 328/56, 37, 119, 162, 165; 340/164 R, 167 R,
167 B

[56] References Cited

UNITED STATES PATENTS

| | | | |
|---|---|---|---|
| 3,051,928 | 8/1962 | Sullivan .......... | 328/119 X |
| 3,072,855 | 1/1963 | Chandler .......... | 328/165 |
| 3,092,830 | 6/1963 | Clock et al. .......... | 328/56 X |
| 3,412,381 | 11/1968 | Hirsch et al. .......... | 328/119 X |
| 3,423,728 | 1/1969 | Wissel .......... | 328/119 X |

*Primary Examiner*—Stanley D. Miller, Jr.
*Attorneys*—Warren H. Kintzinger and Robert J. Crawford

ABSTRACT: Gated logic circuit used as an antijitter circuit in a transponder system with a delay line chain having multiple signal connections from various locations before, between, and after at least three serially connected shift register units of the delay line. The logic circuitry is arranged to gate an output coincident with the leading edge of the second pulse of a two-pulse input, however, should a predetermined signal not have been developed within the logic circuitry prior to appearance of the leading edge of the second input signal pulse, the appearance thereof immediately initiates an inhibit signal through logic circuitry preventing the development of a decoder trigger output for that signal cycle.

Figure 1:
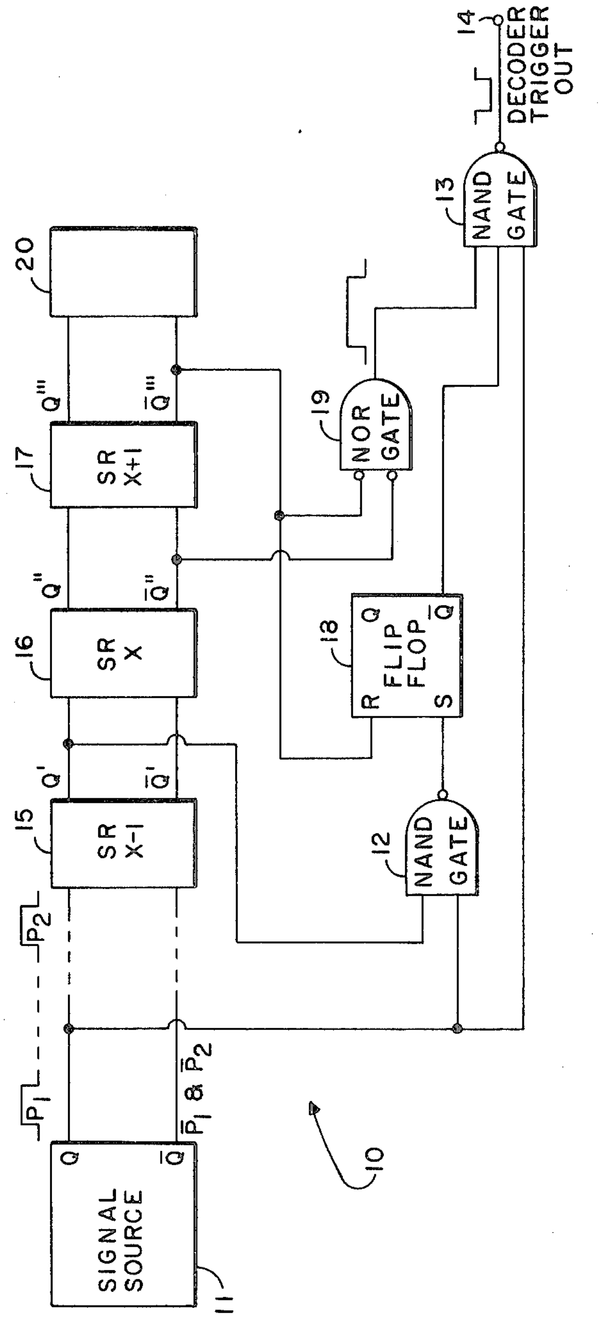

INVENTOR.
LYLE R. STRATHMAN

BY Warren H. Kintzinger
ATTORNEY

INVENTOR.
LYLE R. STRATHMAN

BY Warren H. Kintzinger
ATTORNEY

SIGNAL PULSE TRIGGER-GATING EDGE JITTER REJECTION CIRCUIT

This invention relates in general to pulse time decoders, and in particular, to an antijitter-circuit-equipped pulse time decoder.

When a transmitted signal is received that calls for a transponder reply the reply must be synchronized with the call from the signal-initiating station in order that the return signal be accepted. This requirement for return signal acceptance is, with many transponder equipments, severely compromised by jitter appearing on the output of many pulse time decoders in transponder systems particularly under some operational conditions.

It is therefore, a principal object of this invention to enhance the acceptability of transponder system return signals to the signal-initiating station.

Another object in improving such return signals is to eliminate jitter from the output of transponder system pulse time decoders regardless of signal pulse spacings.

Features of the invention useful in accomplishing the above objects include logic circuitry with gates and a RS flip-flop wherein a first gate develops an output only when a second pulse of a two-pulse input waveform appears before termination of the delayed pulse result of a first pulse of the two-pulse input waveform out of a first delay line unit of three successively serially connected delay line units. The output from the first gate is applied to the set terminal of an RS flip-flop that then remains set for a period with an inhibit signal provided therefrom to an output gate until a reset signal is applied to the reset terminal of the RS flip-flop from a signal point with further delay in the chain of delay line units after the second pulse of the two-pulse input waveform has ended.

A specific embodiment representing what is presently regarded as the best mode of carrying out the invention is illustrated in the accompanying drawings.

Figure 2:
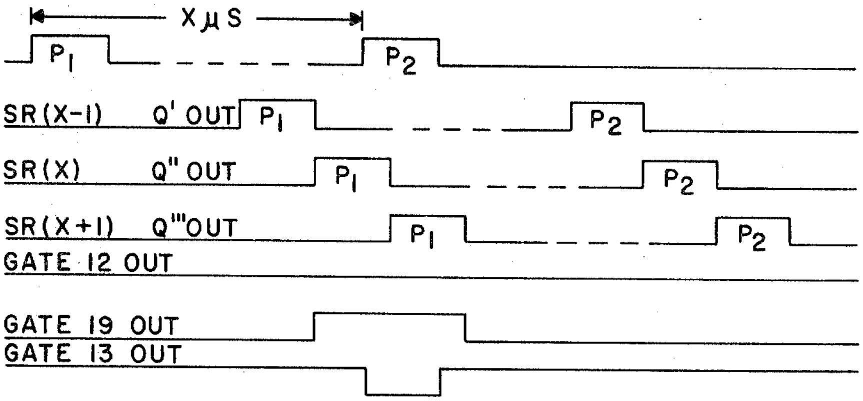
Figure 3:
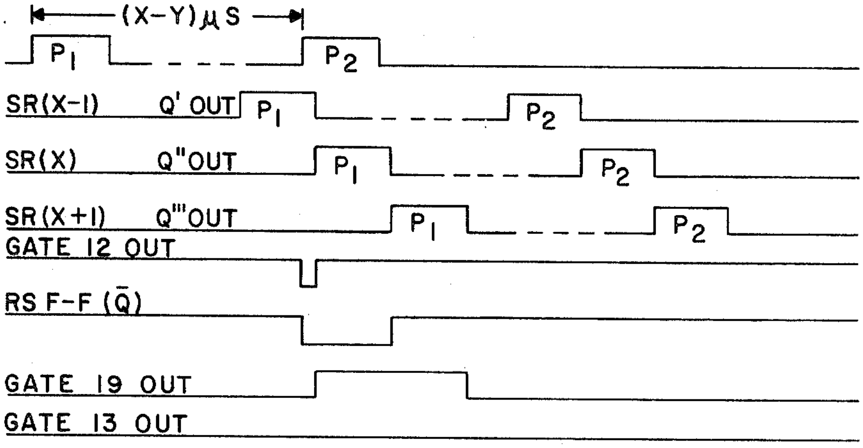
Figure 4:
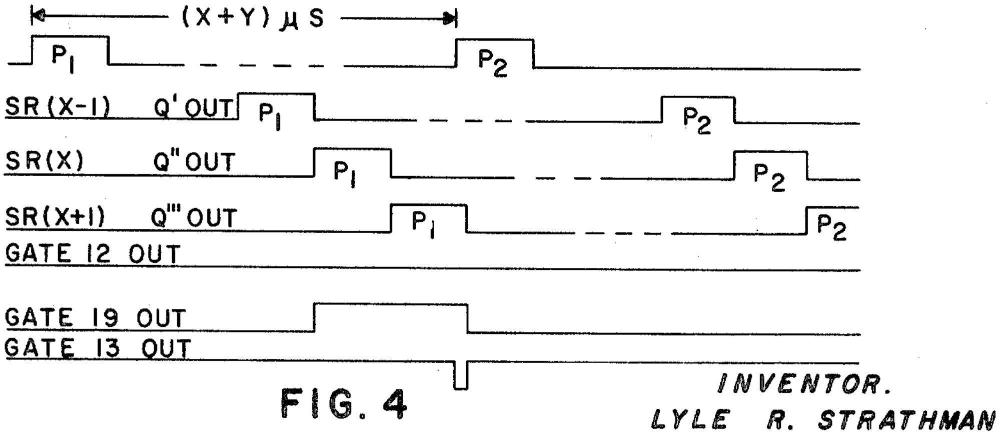

In the drawings:

FIG. 1 represents a combination block and schematic showing of applicant's antijitter circuit as would be employed, for example, in a transponder system;

FIG. 2, a $P_1$–$P_2$ input waveform with normal X $\mu$sec. spacing and resulting waveforms developed at various locations in the circuit;

FIG. 3, a $P_1$–$P_2$ input waveform with short (X−Y) $\mu$sec. spacing (with jitter eliminated) and resulting waveforms developed at various locations in the circuit; and FIG. 4, a $P_1$–$P_2$ input waveform with long (X+Y) $\mu$sec. spacing and resulting waveforms at various locations in the circuit.

Referring to the drawings:

The antijitter circuit 10, of FIG. 1, such as would be used in a transponder system, is shown to be fed a $P_1$ and $P_2$ pulse waveform and the $\overline{P}_1$ and $\overline{P}_2$ waveform inversion thereof from Q and $\overline{Q}$ output terminals of signal source 11. The Q and $\overline{Q}$ outputs from signal source 11 may be the outputs from a flip-flop circuit within the signal source with the Q output applied directly, as such, as an input to two-input NAND-gate 12 and also to three-input NAND-gate 13 having an output connected to a decoder trigger output terminal 14. The Q output from signal source 11 may also be connected directly as an input to shift register 15, or through an intervening delay line unit or multiple units (not shown in detail but with such possibility indicated by the dotted signal path lines). The $\overline{Q}$ inverted output of signal source 11 is in like manner also applied directly or if there are intervening delay line units it is through the same number thereof as with the Q signal. There is a chain of serially connected delay line units including serially connected delay line units 15, 16, and 17, indicated as being shift registers, with the Q′, Q″ and Q‴ and also the $\overline{Q}'$, $\overline{Q}''$, and $\overline{Q}'''$ outputs, respectively, providing successively and progressively delayed reproductions of the $P_1$ and $P_2$ waveform and the $\overline{P}_1$ and $\overline{P}_2$ waveform inversion thereof. In any event the X in shift register 16 signifies any particular one in the whole shift register train other than the very first or the absolute last one thereof; X−1 in shift register 15 the one immediately before; and X+1 in shift register 17 the one immediately after shift register 16. Please note that the $P_1$ and $P_2$ waveform pulses and also the $\overline{P}_1$ and $\overline{P}_2$ waveform inversion pulses are substantially equal in width as determined by a system clock (detail not shown) acting on the signal source 11, and pulse amplitude is substantially uniform.

The Q′ output of shift register 15 is, in addition to being connected as an input to shift register 16, connected as a second input to NAND-gate 12 having an output connection to the S (set) terminal of flip-flop 18. The $\overline{Q}''$ output terminal of shift register 16 is, in addition to being connected to an input terminal of shift register 17, connected as a first input to NOR-gate 19. The Q‴ and $\overline{Q}'''$ output terminals of shift register 17 are connected to continuing circuitry 20 that may include additional shift register units or, be other utilizing circuitry. The $\overline{Q}'''$ output terminal of shift register 17 is also connected to the R (reset) input terminal of flip-flop 18, and also as the second input to NOR-gate 19. The $\overline{Q}$ output terminal of flip-flop 18 and the output of NOR-gate 19 are connected as the second and third inputs, respectively, to NAND-gate 13.

In operation the $P_1$ and $P_2$ waveform is used, via the multiunit delay line shift register chain and antijitter circuit 10 to generate decoder trigger signals generally whenever $P_1$, as delayed through the chain to the output of shift register 16 or shift register 17 comes into coincidence with $P_2$ of the input signal waveform. It is quite important that this operational action be attained without jitter of the decoder trigger output with respect to the $P_2$ pulse of the input pulsed waveform from signal source 11 and with the leading edge of the $P_2$ pulse timing the output trigger pulse under the prerequisite coincidence conditions and otherwise there being an inhibit from development of an output trigger pulse. NAND-gate 12 and RS flip-flop 18 are essential controlling elements in providing the desired inhibit function.

With nominal $P_1$ and $P_2$ waveform pulse spacing and the resulting waveforms developed at various circuit locations as identified in the family of waveforms of FIG. 2 there is no jitter problem to contend with. With shortened $P_1$ and $P_2$ waveform pulse spacing and the resulting waveforms of FIG. 3 other than for the inhibit function of the circuit there would be a jitter problem. With relatively long $P_1$ and $P_2$ waveform pulse spacing and resulting circuit waveforms such as shown by FIG. 4 no jitter condition arises. While the Q′, Q″ and Q‴ delayed pulse waveforms are shown in the waveform families of FIGS. 2, 3 and 4 the $\overline{Q}'$, $\overline{Q}''$ and $\overline{Q}'''$ inversions thereof are not shown, as a matter of convenience. These inverted waveforms are, in effect, strictly that, with negative-going delayed $P_1$ and $P_2$ pulses in exact alignment with their positive-going pulse counterparts. Under the conditions of FIG. 2 and also of FIG. 4 there is not such coincidence between the Q′ pulse and a $P_2$ pulse of the originating $P_1$ and $P_2$ waveform as to activate NAND-gate 12 and thereby the RS flip-flop 18 and no inhibit signal output therefrom is applied as an input to NAND-gate 13. With NOR-gate 19 being activated to apply an output signal pulse as an input to NAND-gate 13 by the $\overline{Q}''$ inverted $P_1$ waveform pulse, and then the $\overline{Q}'''$ inverted $P_1$ waveform pulse giving an activating input to NOR-gate 19 the resulting elongated NOR-gate 19 pulse output shown is applied to NAND-gate 13. Then when the leading edge of the $P_2$ pulse next appears it is applied as an input to NAND gate 13 that immediately gates an output negative-going pulse as shown in FIGS. 2 and 4 extending throughout the remaining period of coincidence of the $P_2$ pulse and the NOR gate output pulse since no inhibit $\overline{Q}$ signal is being developed out of RS flip-flop 18 at the same time.

With the operational state that may be encountered with short (X−Y) $\mu$sec. $P_1$ and $P_2$ pulse spacing, as shown by the FIG. 3 family of waveforms, the leading edge of the $P_2$ pulse in the originating $P_1$ and $P_2$ waveform appears before NOR-gate 19 is activated by any input thereto appears developing a resulting output therefrom applied as an input to NAND-gate 13. This is an undesired state where, were an inhibit function not provided, the leading edge of a pulse signal out of NOR-gate 19 initiates a decoder trigger out out of NAND-gate 13 with $P_2$ of the originating $P_1$ and $P_2$ waveform already on. This is the jitter condition that must be eliminated with respect to decoder trigger-activating pulse signals out of NAND-gate 13. With this condition a signal coincidence between $P_2$, of the originating $P_1$ and $P_2$ waveform, and the Q' delayed pulse comes into existence that is sufficient to develop a resulting NAND-gate 12 negative-going output pulse applied as an activating input pulse to the set terminal of RS flip-flop 18. This sets the flip-flop 18 to provide a negative-going $\bar{Q}$ output pulse therefrom applied as an inhibit input signal to NAND-gate 13 continuing until terminated by a negative-going $\bar{Q}'''$ signal pulse applied to the R (reset) terminal of flip-flop 18 with this termination occurring after the $P_2$ pulse of the originating $P_1$ and $P_2$ pulse waveform. Thus, even though there is some overlap coincidence between $P_2$ of the originating $P_1$ and $P_2$ waveform, and the positive-going pulse output of NOR-gate 19, extending from the edge of the $\bar{Q}''$ to the trailing edge of the $\bar{Q}'''$, $P_1$-initiated signal pulses, decoder trigger output is prevented by the inhibit input to NAND-gate 13 throughout such jitter conditions periods.

Please note, that the $P_1$ and $P_2$ pulses in the initiating waveform could be shorter pulses with pulse-stretching circuitry included in attaining desired operational results substantially as outlined hereinbefore. Further, opposite function gates and a reverse in the direction of some pulses, positive-going to negative-going and visa versa, could be accomplished in circuitry accomplishing the functional equivalent and net jitter-inhibiting results obtained with the specific disclosure presented.

Whereas this invention is here illustrated and described with respect to a specific embodiment thereof, it should be realized that various changes may be made without departing from the essential contributions to the art made by the teachings hereof.

I claim:

1. An antijitter circuit connected to a multiunit delay line having at least a three serially connected group of delay line sections, including in order, by signal flow through said delay line a first delay line section, a second delay line section, and a third delay line section, and subject to receiving a signal input, with at least two spaced pulses in a signal cycle, through signal input path means, including: signal path means interconnecting the delay line, after the signal output of said second delay line section, to gate means having at least three input signal terminals, two requiring simultaneous inputs to give an output and a signal output inhibit input terminal; connection of an input terminal of said gate means to said signal input path means in the delay line to said first delay line section; and inhibit circuit means having a first connection to said signal input path means in the delay line to the first of said delay line sections, a second connection to said multiunit delay line after the signal output of said first delay line section, an output inhibit signal connection to said signal output inhibit terminal of said gate means subject to developing inhibit signal control upon coincidence of signals through said first and second connections of said inhibit circuit means; wherein said inhibit circuit means includes, a two-input flip-flop circuit with set and reset input terminals; a two-input gate with a first input connected as said first connection to said signal input path means, the second input connected as said second connection to said multiunit delay line, and having an output connection to one of the inputs of said two-input flip-flop circuit; the other input of said two-input flip-flop circuits being connected to said delay line after the signal output of the third of said three serially connected delay line sections; and with said flip-flop circuit having an output connection as said output inhibit signal connection to said signal output inhibit terminal.

2. The antijitter circuit of claim 1, wherein said three serially connected delay line sections of said group of delay line sections are shift register units having substantially equal time delays therethrough.

3. The antijitter circuit of claim 2, wherein two signal circuit paths are provided, one the originating signal path, and the inverse signal path; and with these signal paths extended through said shift resister units and subject to substantially identical time delay between the two circuit paths through each shift register unit.

4. The antijitter circuit of claim 2, wherein said two-input gate is a gate developing a gated output as an input signal to said flip-flop circuit whenever input signals are applied in coincidence to both inputs of said two-input gate.

5. The antijitter circuit of claim 4, wherein the output of said two-input gate is connected to the set input terminal of said flip-flop circuit.

6. The antijitter circuit of claim 5, wherein said two-input gate is a NAND gate; and said gate means having at least three-input signal terminals is a three-input NAND gate that, with two inputs in signal coincidence and without an inhibit input, develops an output; and with an inhibit input signal on the third terminal activates said three-input NAND to an inhibit state.

7. The antijitter circuit of claim 6, wherein a gate is included in said signal path means interconnecting the delay line and the three-input gate means, and with the gate in said signal path means having a first input connection from said delay line between said second and third delay line sections, and a second input connection from said delay line after the signal output of said third delay line section.

8. The antijitter circuit of claim 6, wherein a two-input NOR gate in included in said signal path means interconnecting the delay line and the three-input gate means, with a first input of said NOR gate connected to said delay line between said second and third delay line sections, a second input of said NOR gate connected to said delay line after the signal output of said third delay line section; and with the NOR gate having an output connection as an input to said three-input gate means.